United States Patent [19]

Denzinger et al.

[11] 4,058,655

[45] Nov. 15, 1977

[54] MANUFACTURE OF LOW MOLECULAR WEIGHT POLY-N-VINYLPYRROLIDONE-2

[75] Inventors: Walter Denzinger, Speyer; Kurt Seelert; Karl Herrle, both of Ludwigshafen, all of Germany

[73] Assignee: BASF Aktiengesellschaft, Ludwigshafen, Germany

[21] Appl. No.: 665,065

[22] Filed: Mar. 8, 1976

[30] Foreign Application Priority Data

Mar. 29, 1975 Germany .............................. 2514127

[51] Int. Cl.$^2$ .......................... C08F 2/00; C08F 4/00; C08F 26/08
[52] U.S. Cl. .................................. 526/212; 526/227; 526/232; 526/264
[58] Field of Search ................. 526/227, 232, 264, 87, 526/86, 212

[56] References Cited

U.S. PATENT DOCUMENTS

| | | | |
|---|---|---|---|
| 2,335,454 | 11/1943 | Schuster | 526/232 |
| 2,634,259 | 4/1953 | Ney et al. | 526/264 |
| 2,665,271 | 1/1954 | Beller | 526/227 |
| 2,982,762 | 5/1961 | Voeks et al. | 526/264 |
| 3,296,231 | 1/1967 | Resz et al. | 526/264 |
| 3,397,192 | 8/1968 | Grosser et al. | 526/264 |
| 3,563,968 | 2/1971 | Merijan et al. | 526/227 |
| 3,899,461 | 8/1975 | Barabas et al. | 526/264 |

*Primary Examiner*—Herbert J. Lilling
*Attorney, Agent, or Firm*—Keil, Thompson & Shurtleff

[57] ABSTRACT

Low molecular weight poly-N-vinyl-pyrrolidone-2 is prepared by polymerizing N-vinylpyrrolidone-2 at elevated temperature in the presence of organic peroxides which carry organic radicals on either side of the peroxide group.

9 Claims, No Drawings

MANUFACTURE OF LOW MOLECULAR WEIGHT POLY-N-VINYLPYRROLIDONE-2

This invention relates to a process for the manufacture of low molecular weight poly-N-vinylpyrrolidone-2.

It is known that N-vinylpyrrolidone-2 (hereinafter referred to as "vinylpyrrolidone") can be polymerized by free radical polymerization in water or alcohols, suitable catalysts being hydrogen peroxide, alkyl hydroperoxides, dialkyl peroxides and azodiisobutyronitrile. Polymerization in aqueous solution, using hydrogen peroxide, is of industrial importance, whilst polymerization in alcohols suffers from great disadvantages, above all the fact that it proceeds very slowly even if organic per-compounds are used as activators. In particular, the complete polymerization of the last residues of vinylpyrrolidone presents considerable difficulties and requires long periods. Satisfactory removal of the monomer from the polyvinylpyrrolidone, for example by extraction or by chemical means, such as saponification, is extremely involved.

Azodiisobutyronitrile has the additional disadvantage that its decomposition product, tetramethylsuccinodinitrile, is an undesirable impurity.

For industrial processes in aqueous solutions, hydrogen peroxide, the preferred catalyst, has the advantage that it acts as a molecular weight regulator, so that the molecular weight of the polyvinylpyrrolidone can be controlled by varying the amount of hydrogen peroxide.

Since, however, in the polymerization of vinylpyrrolidone in aqeuous solution with hydrogen peroxide the pH drops and since monomeric vinylpyrrolidone can undergo saponification at acid pHs, buffers, eg. amines or ammonia, must be added so that the pH does not fall below 6 – 7. Such buffers of course have the disadvantage that in many cases they must again be removed and as a result demand special measures, eg. reprecipitation of the polymer. Particularly when producing polymers of low molecular weights, below 20,000, which require a reltively large amount of hydrogen peroxide, the drop in pH interferes significantly and substantial amounts of buffer are needed.

Polymers having a K value of 20 or less furthermore have a great tendency to suffer from yellow discolorations, and have a low glass transition temperature, which in turn makes drying difficult and gives powders which easily cake on storage, especially in a moist atmosphere.

It is an object of the invention to manufacture low molecular weight polyvinylpyrrolidone which is used particularly for pharmaceutical and cosmetic purposes and conforms to particularly high quality standards, and which does not suffer from the above disadvantages.

According to our co-pending application Ser. No. 632,653 low molecular weight polyvinylpyrrolidone can be manufactured in good yields by polymerizing N-vinylpyrrolidone continuously in an organic solvent at elevated temperature in the presence of free radical initiators at pressures above one bar. In preferred embodiments, polymerization temperatures of from 100° to 300° C and organic peroxide initiators, especially di-tert.-butyl peroxide, are used. By means of this continuous process, low molecular weight polyvinylpyrrolidone with K values of less than 25 can be manufactured in excellent yields and excellent purity in respect of residual monomer content.

It is a further object of the present invention to extend the scope of the above process, particularly so that it can also be controlled when carried out in simpler industrial apparatus, and that, above all, products with even lower content of residual monomers can be provided.

We have found that these objects are achieved by a process for the manufacture of polymers of vinylpyrrolidone, in which vinylpyrrolidone, if appropriate together with other ethylenically unsaturated monomers which are copolymerizable with vinylpyrrolidone, is polymerized in an organic solvent at above 100° C in the presence of organic peroxides, and wherein the polymerization is carried out batchwise with peroxides which carry aliphatic or aliphatic-aromatic substituents of 1 to 8 carbon atoms per alkyl group on either side of the peroxide group. The preferred conditions to be observed in accordance with the co-pending application Ser. No. 632,653, namely the choice of a reaction temperature above 100° C, of organic solvents and of organic peroxides, and the batchwise method of operation, thus surprisingly give low molecular weight polyvinylpyrrolidone products with even more advantageous properties. The conversion of vinylpyrrolidone is in general greater than 99.9%.

The invention provides a simple industrial process for producing low molecular weight polyvinylpyrrolidone in an organic solvent, in which the above disadvantages are avoided, and furthermore gives a polyvinylpyrrolidone with properties superior to those of the products of the prior art.

The polymerization takes place extremely rapidly under the stated conditions. Only extremely small amounts of residual monomers remain present, and low molecular weight products, which are, in particular, outstandingly suitable for pharmaceutical and cosmetic purposes, are obtained. In general, it is not necessary to add buffers during the polymerization. However, it is frequently advantageous to add small amounts, preferably from 0.1 to 1%, of an amine, eg. triethylamine.

In the batchwise method of the invention for the manufacture of products of low K value, the selection of the suitable organic peroxides is of decisive importance. For the purposes of the invention, suitable peroxides are those which carry an alkyl and/or aralkyl radical of 1 to 8 carbon atoms per alkyl radical on both the peroxide oxygem atoms, and amongst these, specific examples are dicumyl peroxide, di-tert.-butyl peroxide, tert.-butyl cumyl peroxide and 2,2-di-tert.-butyl-peroxybutane. Di-tert.-butyl peroxide is particularly preferred, since its decomposition products are particularly easily removable either during drying or by steam distillation.

The amount of the organic peroxides can vary within wide limits and depends on the desired K value. In general, from 0.1 to 6 percent by weight, preferably from 0.5 to 3 percent by weight, based on monomer, are used.

Suitable organic solvents are those which boil at from 50° to 150° C, ie. the reaction may be carried out under atmospheric or superatmospheric pressure. Examples of suitable solvents are alcohols, eg. methanol, ethanol, n-propanol and i-propanol, ethers, eg. dioxane and tetrahydrofuran, halogen compounds, eg. chloroform, methylene chloride, tetrachloroethane and hexachloroethane, aromatic hydrocarbons, eg. toluene, xylene, cumene and ethylbenzene, and mixtures of the said solvents which are completely miscible with one another, eg. mixtures of isopropanol and cumene or a mixture of several aromatic hydrocarbons, e.g. ethylbenzene and toluene. Preferably, isopropanol is used as the solvent, since it exerts a powerful regulating action on the molecular weight. The concentration of the monomers in the solution is from 5 to 75 percent by weight, preferably from 10 to 50 percent by weight.

Preferably, homopolymers of N-vinylpyrrolidone are manufactured by the process of the invention. However, it is equally possible to manufacture copolymers of N-vinylpyrrolidone by polymerizing N-vinylpyrrolidone together with other ethylenically unsaturated monomers which are copolymerizable with N-vinylpyrrolidone. Examples of suitable monomers which are copolymerizable with vinylpyrrolidone are vinyl esters, eg. vinyl acetate and vinyl propionate, acrylic esters, methacrylic esters, maleic esters and fumaric esters wherein the alcohol is of 1 to 4 carbon atoms, and also hydroxypropyl acrylate, acrylic acid, methacrylic acid, crotonic acid and styrene. It is of course also possible to copolymerize mixtures of several of the said monomers with one another, for example to copolymerize a mixture of vinylpyrrolidone, vinyl acetate and methyl acrylate. The comonomer content of the vinylpyrrolidone polymers can vary within a wide range, eg. can be from 0 (manufacture of homopolymers of vinylpyrrolidone) to 90 percent by weight, preferably to 70 percent by weight.

The actual polymerization is carried out by conventional methods. All the components of the batch can be introduced into a closed system, advantageously a pressure vessel which is tested to 200 bars, after which the air contained in the solutions is removed by applying a vacuum or by flushing with an inert gas. The temperature is then raised to above 100° C, preferably up to 300° C, and especially to 120° - 200° C, and the polymerization is allowed to proceed for from about 3 to 4 hours. The desired K values are obtained by the following measures:

1. By appropriate choice of the amount of the peroxide; large amounts give particularly low K values.
2. By appropriate choice of the solvent; branched-chain solvents give lower K values than straight-chain or unsubstituted aromatic solvents. Secondary alcohols are particularly advantageous solvents.
3. By controlled selection of the monomer concentration; an increase in the monomer concentration also increases the K value.

Accordingly, a broad K value range can be selected by deciding the concentration of the monomer and of the peroxide and the nature of the solvent.

4. By appropriate choice of the reaction temperature; this permits a fine adjustment of the K value, since an increase in temperature reduces the K value.

In a particularly preferred embodiment, the monomer is added gradually during the polymerization, by which means the K value can be lowered yet further. This gradual addition can also comprise gradually introducing a mixture of vinylpyrrolidone, solvent and peroxide. The period of addition may be from 1 to 5 hours.

Using the process of the invention, polymers with molecular weights of from about 3,000 to 50,000, and K values of from 10 to 30, are obtained. K values of from 10 to 20, in particular, are feasible if the above measures regarding gradual addition are employed.

The polymerization can be readily monitored by continuously taking samples and determining the residual vinylpyrrolidone. When the latter has fallen significantly below 1%, the polymerization can be discontinued. The polymerization time is in general from 3 to 5 hours.

The solutions obtained are worked up in the usual way, eg. by direct drying by the conventional methods such as spray drying, roller drying or freeze drying.

In some cases it is advantageous to dilute the completely reacted batch with water, to distil off the organic solvent, if appropriate, either completely or partially, and then to dry the residue. It is frequently advantageous to interpose a steam distillation in order to free the solution from volatile constituents originating, eg., from the vinylpyrrolidone or from the activator. By this means it is possible to obtain completely clear aqueous solutions, especially when di-tert.-butyl peroxide or tert.-butyl perbenzoate is used.

Compared to commercial polymers, which are generally manufactured in accordance with German Pat. No. 922,378, the polyvinylpyrrolidone manufactured according to the invention has a number of advantages. It is possible also to manufacture low molecular weight polymers with a K value of 15, which are completely colorless and can be dried in a spray dryer without causing sintering. Drying is important for polyvinylpyrrolidones used for pharmaceutical parenteral purposes, since the dried product does not act as a nutrient medium for micro-organisms and therefore pyrogens cannot develop during storage of the product. Furthermore, the aqueous solutions are more heat-resistant and discolor only very little on sterilization.

The Examples which now follow illustrate the invention, parts are by weight. The K values were determined by the method of H. Fikentscher, Cellulose-Chemie 13, 58–64 and 71–74 (1932) in 5 percent strength aqueous solution at 20° C; $K = k.10^3$.

EXAMPLE 1

77 parts of toluene, 6 parts of vinylpyrrolidone and 0.24 part of di-tert.-butyl peroxide are introduced into a stirred pressure reactor. The reactor is sealed pressure-tight and is substantially freed from atmospheric oxygen by twice charging with nitrogen to 4 bars pressure, and letting down again. The contents of the reactor are now heated to 140° C, whereupon the pressure assumes a value of 1.5 bars, and a mixture of 63 parts of toluene, 54 parts of vinylpyrrolidone and 2.16 parts of di-tert.-butyl peroxide is then fed in at 140° - 145° C for the period shown in the Table which follows. Polymerization is then continued for about 3 hours until the monomer content has fallen to less than 0.5% (based on vinylpyrrolidone employed). The batch is then cooled to 85° C and diluted with 60 parts of water, and the toluene is stripped off by passing steam into the mixture. When the internal temperature reaches 98° C, distillation is continued until a further 60 parts of distillate have passed over. The solution, of about 30 percent strength, is then spray-dried.

TABLE

| Experiment | Period of addition | K value |
|---|---|---|
| a | 1¼ hours | 23.1 |
| b | 2¼ hours | 18.5 |

EXAMPLE 2

This is carried out like Example 1 b, except that 0.36 part of di-tert.-butyl peroxide is introduced initially and 3.24 parts are subsequently run in.

The K value of the polymer is 16.4.

EXAMPLE 3

77 parts of isopropanol, 6 parts of vinylpyrrolidone and 0.24 part of di-tert.-butyl peroxide are first introduced into an apparatus as described in Example 1, and after heating to 140° C and setting up a pressure of 7 bars, a mixture of 63 parts of isopropanol, 54 parts of vinylpyrrolidone and 2.16 parts of di-tert.-butyl peroxide are run in for the period shown in the Table which follows. The polymerization and working up take place as described in Example 1.

TABLE

| Experiment | Period of addition | K value |
|---|---|---|
| a | 2¾ hours | 12.5 |
| b | 4 hours | 12.0 |

EXAMPLE 4

This is carried out like Example 3 a, except that 0.36 part of di-tert.-butyl peroxide is introduced initially and 3.24 parts are subsequently run in.

The K value of the polymer is 12.4.

EXAMPLE 5

77 parts of isopropanol, 6 parts of vinylpyrrolidone and 0.24 part of di-tert.-butyl peroxide are first introduced into an apparatus as described in Example 1, and after heating to 125° C and setting up a pressure of 4 bars, a mixture of 63 parts of isopropanol, 54 parts of vinylpyrrolidone and 2.16 parts of di-tert.-butyl peroxide are run in over 2¾ hours. The polymerization and working up take place as described in Example 1. The K value of the polymer is 13.7.

We claim:

1. A process for the manufacture of homopolymers of N-vinylpyrrolidone-2 of low molecular weight having K values of less than 25 as measured by the method of H. Fikentscher, in 5 percent strength aqueous solution at 20° C, and said homopolymers having less than 0.1% residual monomer which comprises polymerizing said vinylpyrrolidone in an organic solvent at above 100° C. in the presence of an organic peroxide which carries an aliphatic or araliphatic radical, respectively of 1 to 8 or of 6 to 8 carbon atoms, on either side of the peroxide group, said vinylpyrrolidone as the monomer being gradually added during the polymerization within a period of 1 to 5 hours.

2. A process as claimed in claim 1, wherein the peroxide employed is dicumyl peroxide, di-tert.-butyl peroxide, tert.-butyl cumyl peroxide or 2,2-di-tert.-butylperoxybutane.

3. A process as claimed in claim 1, wherein from 0.1 to 6% by weight of peroxide, based on monomer, is employed.

4. A process as claimed in claim 1, wherein said vinylpyrrolidone as the monomer is gradually added together with the solvent and the peroxide during the polymerization.

5. A process as claimed in claim 1, wherein the polymerization temperature is above 100° up to 300° C.

6. A process as claimed in claim 1, wherein the polymerization temperature is about 120° to 200° C.

7. A process as claimed in claim 1, wherein the organic solvent has a boiling point of about 50° to 150° C.

8. A process as claimed in claim 1, wherein the organic solvent is isopropanol.

9. A process as claimed in claim 1, wherein the vinylpyrrolidone as the monomer is gradually added during the polymerization within a period of about 3 to 4 hours.

* * * * *